C. FÉRY.
ELECTRIC CELL.
APPLICATION FILED MAR. 6, 1916.

1,201,709.

Patented Oct. 17, 1916.

Inventor
Charles Féry
By Attorneys
Fraser Spirhd Myers

UNITED STATES PATENT OFFICE.

CHARLES FÉRY, OF PARIS, FRANCE.

ELECTRIC CELL.

1,201,709. Specification of Letters Patent. Patented Oct. 17, 1916.

Application filed March 6, 1916. Serial No. 82,396.

*To all whom it may concern:*

Be it known that I, CHARLES FÉRY, a citizen of the Republic of France, residing in Paris, France, have invented certain new and useful Improvements in or Relating to Electric Cells, of which the following is a specification.

The local action in the case of the majority of cells is due to the convection of the liquid around the negative electrode, usually consisting of zinc. Now the zinc salts thus formed have a greater density than that of the exciting liquid around the negative electrode. Moreover with the present form of zinc electrodes which are immersed vertically in the liquid, it can be remarked that it is at the surface of the liquid that the zinc disintegrates or wears away. This is due to the presence of the oxygen of the air, which accelerates dissolution of the zinc at this point. The presence of the zinc at the surface of the liquid has also the disadvantage of absorbing the oxygen that dissolves in the liquid and which contributes to depolarize the carbon electrode.

It should be added that the diffusion of the zinc salts at the upper part of the liquid has the further detrimental effect of forming oxy salts in the pores of the positive carbon electrode, which salts foul this electrode by the formation of crystals or of zinc hydrate. The zinc salts formed during normal working of the cell tend by their density to unite into a denser layer at the bottom of the cell vessel. If therefore the negative electrode is placed horizontally at the bottom of the vessel the entire surface of the zinc will be in a liquid of uniform constitution and the local actions will be avoided. On the other hand upper part of the positive electrode which occupies the rest of the height, will never be in contact with the saturated zincic solution thus formed, and as its porosity will remain good, depolarization will be rapid.

Figure 1:
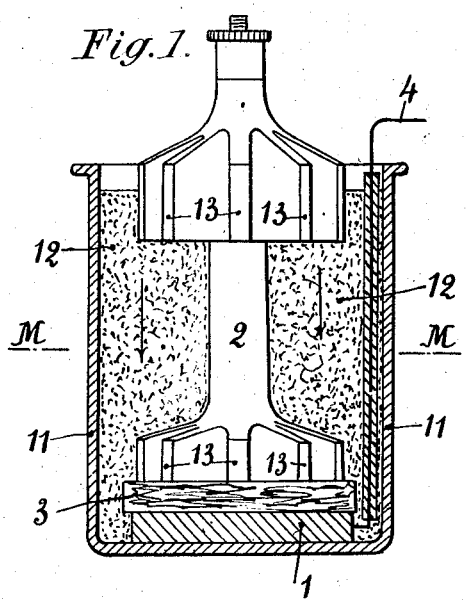
Figure 3:
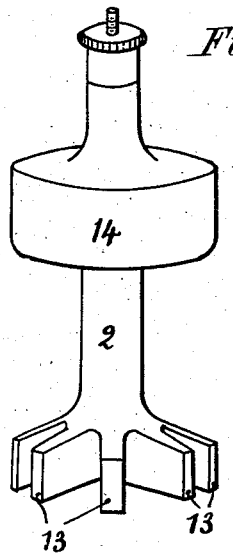
Figure 2:
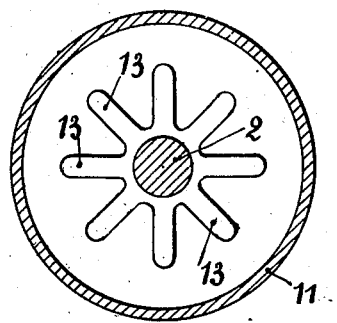
Figure 4:
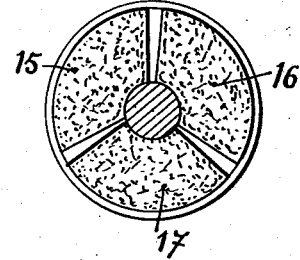
Figure 5:
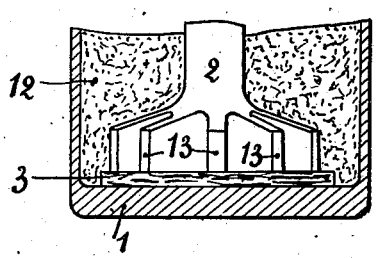
Figure 6:
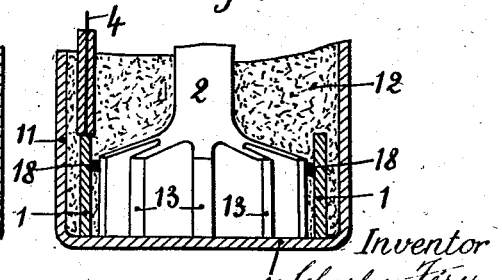

In the accompanying drawings: Figure 1 is a vertical section of a dry cell to which the invention is applied. Fig. 2 is a horizontal section on line M, M, Fig. 1. Fig. 3 is a perspective view of a modification of the carbon element of the cell of Fig. 1. Fig. 4 is a plan of another modification. Figs. 5 and 6 show in vertical section the lower part of two other modifications.

To take a concrete case, if we take the zinc, carbon, ammonium chlorid cell, embodying the conditions set out above, this cell will be constituted as follows: The zinc plate 1 (Fig. 1) placed in the bottom of the vessel is insulated from the carbon cylinder 2 by a felt disk or ring 3 or by a cruciform or other suitable piece of ebonite or any other insulating material. The contact with this piece of zinc is made by a wire 4 insulated for its entire vertical portion by gutta percha or other insulating material.

During the working of the cell a litmus or turmeric paper occupying the entire depth of the vessel will show that the liquid below the felt becomes acid, chlorid of zinc being formed here. On the other hand the light liquid occupying the upper portion of the cell becomes alkaline, as it contains the ammonia of the exciting salt. The ammonia gas can therefore be liberated freely and without encountering the chlorid of zinc, with which it would form the well known crystals of ordinary sal ammoniac cells. The bottom of the positive electrode being at a very small distance from the negative, the electric resistance of the cell is very low.

It is further to be observed that the fall of the liquid level in the vessel in consequence of evaporation does not cause the surface of the electrodes in presence of each other to vary as in the usual construction.

The rapid depolarization of the cells of this system arises from electric currents which are generated between the top and the bottom of the carbon electrode.

Referring to Fig. 1, it will be remarked that after working, the bottom of the electrode is much polarized, while the top, bathed by a liquid in contact with the air, is very little polarized. Consequently an electric current is established between these two points, and the strength of which regulates the depolarization. The strength of these currents is further increased by the fact that the positive electrode is in contact in its height with liquids of different densities and consequently of different constitutions. In order that this depolarization may be rapid the horizontal section of the liquid should also be great and the depth of the cell small.

It will be seen that the surface of the carbons and of the liquid which is exposed to the air is considerable and that the depolarizing electric currents have only a small depth of liquid to traverse; it follows that the electric resistance which they have to overcome is very low. The strength of these currents is therefore great and the depolarization is rapid.

The principles above set out for liquid cells may be applied with advantage to so called dry cells in which a suitable porous material immobilizes the liquid. Experience shows in fact that one of the most frequent causes of stoppage of these cells is the formation of oxy salts of zinc which become deposited in the pores of the substance in which the liquid is absorbed. Moreover these oxy salts foul the depolarizing mass, which is most generally formed of a compressed mixture of graphite and manganese binoxid powder. Finally this mixture, being surrounded on all sides by the absorbent mass and by the zinc, cannot allow the ammonia gas which goes to it during the working of the cell, to be liberated.

In this application of the invention the zinc 1 placed right at the bottom of an insulating vessel 11 of glass, ebonite or the like, is covered with a sheet of felt 3 which separates it from a bottom of the positive carbon electrode 2. The whole cell is filled with pumice powder 12 or any other inert absorbent material, wetted with a solution of sal ammoniac.

The upper and the lower parts of the carbon electrode are provided with wings 13, so that its median portion is of smaller section than the end portions. This form of electrode also gives excellent results when employed in free liquid cells. It has the advantage of increasing the section of the liquid traversed by the depolarizing currents, the direction of which is that shown by the arrows in Fig. 1. Moreover it occupies less space than an electrode of uniform section, thereby permitting of increasing the volume of the exciting liquid.

In cases where it is desired to use a depolarizer such as binoxid of manganese for example, this depolarizer should occupy the place of the upper wings or ribs of the electrode 14 (see Fig. 3).

The binoxid may be placed in a bag 14 mixed with graphite as is usually done, or it may be constituted of three agglomerated blocks 15, 16 and 17 (Fig. 4) occupying not quite one-third of the circumference and not touching each other. These agglomerated blocks held tightly together by a cord are thus pressed against the rod of the electrode at the middle. The solution of sal ammoniac will tighten the cord still more when this is wetted, and thus insure a perfect contact with the electrode.

The E. M. F. of one of my cells when depolarized by air is 1.2 volt. The presence of binoxid of manganese increases the voltage to about 1.5 volt.

If it is desired to utilize the vessel itself as the negative electrode, it will only be necessary to replace the insulating vessel 11 of Fig. 1 by a zinc vessel having a thick bottom (see Fig. 5) which takes the place of the separator zinc plate above referred to. The vertical walls of the vessel, which may be thin, as they have not to be attacked, would be carefully varnished with Judee's bitumen.

5 indicates the insulating disk of felt. The conducting wire 4 is then soldered to the top of the zinc vessel.

The space between the top of the vessel and the agglomerate or the bag may be filled with wax or marine glue serving as a closure. These cells in point of fact should not be closed hermetically, but in such manner as to permit of the liberation of the ammonia and access of the air. The mass surrounding the zinc placed at the bottom has moreover but little tendency to dry because very deliquescent chlorid of zinc forms at this level.

During the working of the cell water is formed at the upper part to which the ammonia goes and which in presence of the oxygen of the air or of the depolarizer gives the reaction,

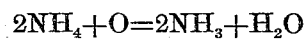

$$2NH_4+O=2NH_3+H_2O$$

It is only necessary to pour a few cubic centimeters of water on to the top of the carbon after the cell has been standing for a long time, in order to restore its original energy.

Experience shows that the true or normal working of the cell, whether with free liquid or as dry cell, is only attained when the bottom of the carbon is immersed in the heavy solution of chlorid of zinc which is produced by the operation of the cell itself.

In the case of the horizontal zinc electrode placed at a slightly lower level below the carbon,—this distance being regulated by the insulator separating the two electrodes,—the normal working is only attained after some hours of service. In this case in fact the zincic solution can only reach the carbon by diffusion. In view of this fact the flat horizontal electrode may be replaced (see Fig. 6) by a zinc cylinder 1 of small height surrounding the bottom of the channeled electrode Fig. 6. The normal working is then attained at once.

18 indicates a cord or bead which insulates the zinc from the carbon electrode.

Claims:

1. An electric battery comprising a zinc electrode at the bottom part of the receptacle and a vertically arranged carbon electrode, said vertical carbon electrode having an extended surface at its upper portion near the surface of the electrolyte, and adapted to occlude oxygen from the air for depolarizing purposes, and having its intermediate portion below the surface of the electrolyte of reduced diameter, the space between the upper and lower parts of the vertical electrode around the intermediate portion of reduced diameter being clear and permitting the free upward circulation of the electrolyte and gas formed therein beneath the extended electrode surface at the upper part of the vertical electrode.

2. An electric battery comprising a zinc electrode at the bottom part of the receptacle, and a vertically arranged carbon electrode, said vertical carbon electrode having an extended surface at its upper portion near the surface of the electrolyte, said upper portion containing a depolarizing substance, said vertical electrode having its intermediate portion below the surface of the electrolyte of reduced diameter, the space between the upper and lower parts of the vertical electrode around the intermediate portion of reduced diameter being clear and permitting the free upward circulation of the electrolyte and gas formed therein beneath the extended electrode surface at the upper part of the vertical electrode.

3. A carbon electrode adapted to stand upright in an electrolyte, having a bottom portion adapted to be situated adjacent a negative electrode, having an intermediate portion 2 of reduced diameter and of considerable length, and having a depolarizer upper portion, the space between the upper and lower parts of the vertical electrode around the intermediate portion 2 being clear, whereby circulation of the electrolyte and the gas therein is permitted when the electrode is in use.

In witness whereof, I have hereunto signed my name in the presence of two subscribing witnesses.

CHARLES FÉRY.

Witnesses:
 CHAS. P. PRESSLY,
 RENÉ BAROLY.